April 20, 1937.   F. W. HALL   2,077,995
PNEUMATIC VALVE
Filed Sept. 3, 1935
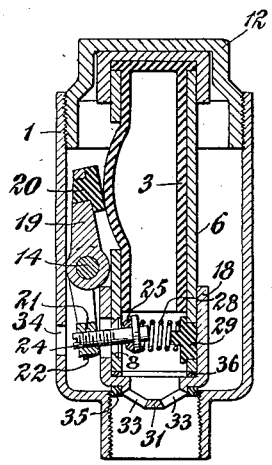
Fig. 2
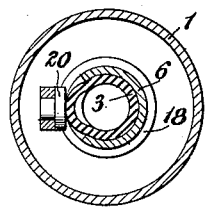
Fig. 3
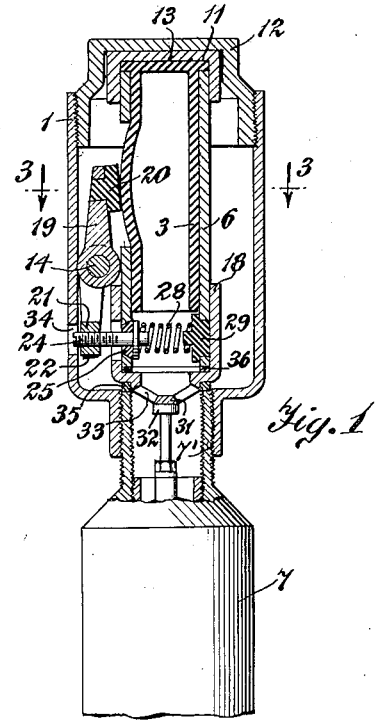
Fig. 1
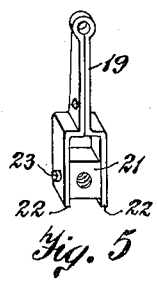
Fig. 5
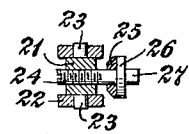
Fig. 4
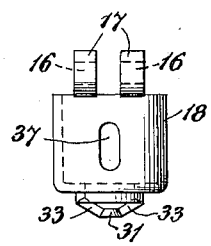
Fig. 6
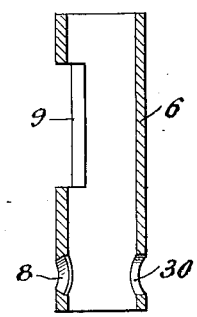
Fig. 7
INVENTOR:
FREDERICK WILSON HALL
BY
ATTORNEY.

Patented Apr. 20, 1937

2,077,995

UNITED STATES PATENT OFFICE 2,077,995

PNEUMATIC VALVE

Frederick Wilson Hall, Brooklyn, N. Y.

Application September 3, 1935, Serial No. 38,989

3 Claims. (Cl. 152—11.5)

This invention relates to pneumatic tire valves and particularly to a device for automatically regulating air pressure in pneumatic tires for vehicles preventing air compression to reach a point beyond the predetermined pressure thereby eliminating the danger of damaging the tire by causing a blow out.

The general object of this invention is to provide a device of the indicated class improved in various particulars whereby to produce accuracy and reliability in the use of the device as well as simplicity of construction and convenience of adjustment and operation.

The nature of this invention and its distinguishing features and advantages will clearly appear as the description proceeds, and as shown in the accompanying drawing, constituting a material component of this disclosure, and in which:—

Figure 1 is a vertical sectional view showing the valve elements in their position at low air pressure.

Figure 2 is a similar sectional view of the valve in the position when the tire attains an excessive air pressure.

Figure 3 is a cross sectional view through the valve taken on line 3—3 of Figure 1.

Figure 4 is a sectional view of the adjustable valve stem arrangement.

Figure 5 is a perspective view of the valve operating lever.

Figure 6 is a perspective view of the valve operating lever support.

Figure 7 is a longitudinal sectional view of the hollow housing for the valve actuating member.

Referring to the drawing, wherein like numerals designate like parts, it can be seen that numeral 7 represents the stem of the valve commonly used in connection with pneumatic tires.

In carrying out the present invention, the numeral 1 designates a casing preferably open at the top and provided with an interiorly threaded lower end for engaging the exteriorly threaded valve stem 7.

Centrally arranged within the casing in a cylindrical housing 6, open at both ends, and provided near one end with a valve seat 8, see Figure 7, and with an enlarged lateral opening 9 located intermediate the valve seat and the upper end of the housing.

Closely fitting the housing 6 is an expansible air container 3, preferably made of rubber, the container being open at the lower end closed at the upper end and provided with a flange 11 at the top.

A cover plug 12 is threaded into the casing 1, and a cap 13 is disposed underneath the cover plug 12, closely fitting over both the housing 6, and the container 3.

A valve operating lever 19 is arranged in juxtaposition within the housing 6 mounted on a pivot pin 14 passing through the transversely bored end of a lever 19 supported in lugs 17 of the valve stem opening shell 18 shown in Figure 6, and hereinafter explained in detail.

The upper end of the lever 19 is provided with a disc 20 preferably made of rubber, while the other end of the lever terminates in a fork 22 to engage an adjustable nut 21 pivotally secured thereto by pins 23, see Figures 4 and 5.

Operative within the nut is a threaded stem 24, provided with a valve disc 25 held in its position by a flange 26 on the valve stem 27 which, extending beyond the flange 26, is encircled by a spring 28; the other end of the stem is held in place by a stop 29 set in an opening 30 of the wall of the housing 6, so as to prevent the spring 28 from being displaced.

As will be apparent from the foregoing description, the valve stem opening shell 18 supports the valve operating lever 19 which extends down far enough to allow its closed lower end 31 to force down the end 32 of the standard tire valve 7, thereby opening the tire valve, allowing the air from the tire to pass into the safety device by way of port holes 33.

Air flowing from the tire into the safety device causes internal pressure in the container 3 which will bulge out through the opening 9 in the housing 6 against the disc 20 of the valve operating lever 19 causing the latter to act upon the valve stem 24 thereby moving the valve disc 25 away from the valve seat 8 and remaining in that position until the excess high pressure in the tire is eliminated by escaping through an opening 34 in the outer casing 1.

Thus, upon decreasing the excessive pressure of the tire, the distortion of the container 3 will disappear, followed by the return of the valve disc 25 to the valve seat 8, by means of both, the air of the tire as well as the spring 28, the disc remaining there until excess pressure within the tire again occurs.

The lower end 31 of the valve stem opening shell 18 is provided with a ring washer 35, preferably of rubber, which will engage the end of the valve stem casing 7, thereby preventing the air of the tire from escaping at that point.

Also in the lower inside section of the valve stem opening shell 18, almost immediately above the washer 35, is another washer 36, engaging the lower end of the housing 6, in order to prevent the leakage of the air from the tire at that point.

Although the improvements have been described with considerable detail and with respect to a certain particular form of the invention, it is not desired to be limited to such details since many changes and modifications may well be made without departing from the spirit and scope of the invention in its broadest aspect.

Having thus described the invention, what is claimed as new and desired to secure by Letters Patent, is:—

1. A safety valve for automatically regulating air pressure in pneumatic tires having an air valve, comprising a closed outer casing, an inner housing having a lateral opening, an expansible air container enclosed by said inner housing, a control lever actuated by expansion of said air container through the mentioned opening, a cap on said outer casing confining said housing and container, and a spring pressed valve in said housing actuated by said lever to control said air valve.

2. A safety valve for automatically regulating air pressure in pneumatic tires having an air valve, comprising a casing mounted on the valve, a housing within said casing, a valve seat in said housing, said housing having a lateral opening remote from said valve seat, an expansible container enclosed by said housing, and partially projecting into the housing opening when under internal pressure, operating means comprising a shell surrounding the inner end of said housing, a lever pivoted on said shell controlling the air valve, and an air escape port in said casing.

3. A safety valve for automatically regulating air pressure in pneumatic tires having an air valve, comprising a casing, a tubular housing rigidly secured in spaced relation therein, said housing having a valve seat and an elongated opening spaced therefrom, a flexible expansible tube enclosed in said housing, said tube being closed at the outer end and open at its inner end to said housing, a spring impelled valve for said seat, a shell on the inner end of said housing, and a lever operatively pivoted on said shell engaging said valve, said lever having a part passing through the mentioned elongated opening in said housing to contact said tube thereby to actuate said air valve.

FREDERICK WILSON HALL.